US012714098B2

(12) United States Patent
Wall

(10) Patent No.: US 12,714,098 B2
(45) Date of Patent: Aug. 25, 2026

(54) AGROCHEMICAL ELECTROLYTE COMPOSITIONS

(71) Applicant: Croda, Inc., Edison, NJ (US)

(72) Inventor: Jason Stewart Wall, Edison, NJ (US)

(73) Assignee: Croda, Inc., Plainsboro, NJ (US)

( * ) Notice: Subject to any disclaimer, the term of this patent is extended or adjusted under 35 U.S.C. 154(b) by 0 days.

(21) Appl. No.: 16/621,931

(22) PCT Filed: Jun. 4, 2018

(86) PCT No.: PCT/US2018/035815

§ 371 (c)(1),
(2) Date: Dec. 12, 2019

(87) PCT Pub. No.: WO2018/231567

PCT Pub. Date: Dec. 20, 2018

(65) Prior Publication Data

US 2020/0128819 A1 Apr. 30, 2020

Related U.S. Application Data

(60) Provisional application No. 62/518,866, filed on Jun. 13, 2017.

(51) Int. Cl.
*A01N 25/04* (2006.01)
*A01N 25/30* (2006.01)

(52) U.S. Cl.
CPC ............ *A01N 25/04* (2013.01); *A01N 25/30* (2013.01)

(58) Field of Classification Search
CPC ................................ A01N 25/04; A01N 25/30
See application file for complete search history.

(56) References Cited

U.S. PATENT DOCUMENTS

| | | | | |
|---|---|---|---|---|
| 5,482,529 | A | 1/1996 | Ahlnas et al. | |
| 6,093,680 | A * | 7/2000 | Gillespie | A01N 25/28 504/363 |
| 9,872,490 | B2 | 1/2018 | Lindner | |
| 2008/0139392 | A1 | 6/2008 | Acosta-Zara et al. | |
| 2008/0194410 | A1 | 8/2008 | Baseeth et al. | |
| 2010/0196430 | A1 | 8/2010 | Maekawa et al. | |
| 2011/0245078 | A1* | 10/2011 | Tang | A01N 51/00 514/772.1 |
| 2013/0017953 | A1* | 1/2013 | Malec | A01N 57/20 504/206 |
| 2014/0154357 | A1 | 6/2014 | Baseeth et al. | |
| 2015/0181865 | A1* | 7/2015 | Schnabel | A01N 25/30 504/307 |
| 2016/0324150 | A1 | 11/2016 | Baseeth et al. | |
| 2017/0280713 | A1 | 10/2017 | Policello et al. | |
| 2018/0235228 | A1* | 8/2018 | Iigaya | A01N 25/08 |
| 2019/0053485 | A1* | 2/2019 | Ogawa | A01P 3/00 |

FOREIGN PATENT DOCUMENTS

| | | | | |
|---|---|---|---|---|
| CN | 1336931 | A * | 2/2002 | A23J 7/00 |
| CN | 1993044 | A | 7/2007 | |
| CN | 101263819 | A | 9/2008 | |
| CN | 101677527 | A | 3/2010 | |
| CN | 102763675 | A | 11/2012 | |
| CN | 103535378 | A | 1/2014 | |
| CN | 104522080 | A | 4/2015 | |
| CN | 105338816 | A | 2/2016 | |
| CN | 105638744 | A | 6/2016 | |
| CN | 105766896 | A | 7/2016 | |
| EP | 0115622 | A2 | 8/1984 | |
| JP | 5955801 | A | 3/1984 | |
| JP | 5955804 | A | 3/1984 | |
| JP | 2001354506 | A | 12/2001 | |
| JP | 2002201104 | A | 7/2002 | |
| JP | 2010516706 | A | 5/2010 | |
| JP | 2010518126 | A | 5/2010 | |
| JP | 2013121901 | A | 6/2013 | |
| JP | 2014520532 | A | 8/2014 | |
| JP | 2015519294 | A | 7/2015 | |
| WO | 2008091871 | A2 | 7/2008 | |
| WO | 2008100896 | A2 | 8/2008 | |
| WO | 2013003670 | A1 | 1/2013 | |

(Continued)

OTHER PUBLICATIONS

Wyenandt, A., Understanding Protectant Fungicides, 2020, Plant and Pest Advisory, Screen shot from https://plant-pest-advisory.rutgers.edu/growers-guide-to-understanding-the-protectant-fungicides-frac-groups-m1-m11-2-2/ (Year: 2020).*

NAIP, Systemic Fungicides—Benomyl, carboxin, oxycarboxin, Metalaxyl, Carbendazim,—characteristics and use, 2011, Development of e-courses for B.Sc (Agriculture), NAIP, http://eagri.org/eagri50/SSAC222/lec31.pdf from http://eagri.org/eagri50/SSAC222/index.html—lesson 31: Systemic Fungicides (Year: 2011).*

Hutton et al., machine translation of CN-1336931—A provided by PE2E via FIT, 2002 (Year: 2002).*

BASF, "Attagel® Rheology modifiers", 2016, from:https://www.l-i.co.uk/images/brochure/181/1/LI-BROCH%20Attagel%20Rheology%20Modifiers.pdf (Year: 2016).*

(Continued)

*Primary Examiner* — Isis A Ghali
*Assistant Examiner* — Ayaan A Alam
(74) *Attorney, Agent, or Firm* — Buchanan Ingersoll & Rooney PC

(57) ABSTRACT

An agrochemical concentrate comprises lecithin and at least one agrochemical active. The agrochemical concentrate may also comprise a dispersant selected from sucrose ester, alkylpolyglucoside, alkylnaphthalene sulphonates, phosphate ester, sorbitol ester, polyglycerol ester, alkyl sulphates, sodium lauryl sulphate, alkylglucamides, and dialkyl sulphosuccinates. An aqueous formulation comprises a dilution of the agrochemical concentrate in an electrolyte. A preblend comprises lecithin and a dispersant. A method of preparing the agrochemical concentrate and a method for treating vegetation are also disclosed.

13 Claims, No Drawings

(56) References Cited

FOREIGN PATENT DOCUMENTS

| | | | |
|---|---|---|---|
| WO | 2013134267 | A1 | 9/2013 |
| WO | 2016054318 | A1 | 4/2016 |

OTHER PUBLICATIONS

Coscollà C. et al., Particle size distributions of currently used pesticides in ambient air of an agricultural Mediterranean area, 2014, Atmospheric Environment, 95, 29-35 (Year: 2014).*

Nyankson, E., et al., "Soybean Lecithin as a Dispersant for Crude Oil Spills," Apr. 7, 2015, pp. 920-931, vol. 3, No. 5, XP055493682, ISSN: 2168-0485, ACS Sustainable Chemistry & Engineering.

International Preliminary Report on Patentability and Written Opinion for International Application No. PCT/US2018/035815, Issued Dec. 17, 2019, 12 pages.

International Search Report and Written Opinion for International Application No. PCT/US2018/035815, dated Jul. 30, 2018, 13 pages.

Chinese Office Action for Chinese Application No. 201880039347.3, dated May 24, 2021 with translation, 41 pages.

Guojun et al. edited. "Surfactant Chemistry", Beijing Institute of Technology Press, 1st edition, pp. 255-261, Aug. 31. 2009 (partial translation).

Japanese Notice of Reasons for Refusal for Japanese Application No. 2019-568300, dated Nov. 2, 2021, with 1 translation, 5 pages.

Canadian Examination Report for Canadian Application No. 3,065,143, dated Oct. 27, 2023, 6 pages.

* cited by examiner

AGROCHEMICAL ELECTROLYTE COMPOSITIONS

CROSS REFERENCE TO RELATED APPLICATIONS

This application is the National Stage filing of International Appln. No. PCT/US2018/035815, filed Jun. 4, 2018, and claims priority to U.S. Provisional Application No. 62/518,866, filed Jun. 13, 2017, both of which are incorporated herein by reference for all purposes.

FIELD OF INVENTION

The present invention relates to compounds for agrochemical concentrates and active formulations. The present invention also includes to treating crops with such formulations.

BACKGROUND OF THE INVENTION

Agrochemical compositions can provide nutrients, growth regulators and/or pesticides, e.g. herbicides, insecticides, fungicides or acaricides. Many agrochemicals are applied by spraying after dilution into a spray tank. To reduce cost, there is a growing trend to combine multiple components in the spray tank resulting in complex mixtures. Combining pesticide concentrates with liquid fertilisers (LF) allows fewer passes over a field reducing fuel use, soil compaction, tractor wear, and crop damage.

However, many agrochemical compositions are not compatible with these complex spray tank mixtures, including liquid fertilisers, due to the high loading of electrolytes. Many surfactants and dispersants are incompatible with high electrolyte systems which can result in flocculation and separation of the dispersed agrochemical phase in the spray tank. This can lead to inconsistent application of the agrochemical and to clogging of the spray nozzles and filters.

Their high concentration of dissolved electrolyte makes combining LFs with other adjuvant components in high concentration spray solutions challenging because including LFs can result in physical instability or incompatibility of the resulting mixture of pesticide alone or in combination with COC, NIS, and LF products. There are many complex processes producing such incompatibility including coalescence, creaming, sedimentation, flocculation, and heteroflocculation.

There are two approaches to improve the compatibility of pesticide formulations with liquid fertiliser: compatibility agents and compatible concentrates. However, there still exists a need for a general solution for the compatibility of agrochemical compositions with high electrolyte systems.

This invention relates to agrochemical compositions and particularly to homogeneous concentrates which form stable dilutions with water and electrolyte agrochemicals such as fertiliser electrolytes.

The present invention seeks to provide the use of compounds in agrochemical compositions in combination with an agrochemical active, where the compounds may provide desired stability in the composition as a concentrate, and/or when mixed with fertiliser electrolytes.

SUMMARY OF THE INVENTION

According to a first aspect of the present invention there is provided an agrochemical concentrate comprising;

i) lecithin;

ii) optionally a dispersant selected from the group comprising sucrose ester, alkylpolyglucoside, alkylnaphthalene sulphonates, phosphate ester, sorbitol ester, polyglycerol ester, alkyl sulphates, sodium lauryl sulphate, alkylglucamides, and dialkyl sulphosuccinates;

iii) at least one agrochemical active.

According to a second aspect of the present invention there is provided a method of preparing a concentrate in accordance with the first aspect, said method comprising mixing:

i) lecithin;

ii) optionally a dispersant selected from the group comprising sucrose ester, alkylpolyglucoside, alkylnaphthalene sulphonates, phosphate ester, sorbitol ester, polyglycerol ester, alkyl sulphates, sodium lauryl sulphate, alkylglucamides, and dialkyl sulphosuccinates;

iii) at least one agrochemical active.

According to a third aspect of the present invention there is provided a method of preparing a concentrate in accordance with the first aspect, said method comprising adding a pre-blend of lecithin and optionally a dispersant selected from the group comprising sucrose ester, alkylpolyglucoside, alkylnaphthalene sulphonates, phosphate ester, sorbitol ester, polyglycerol ester, alkyl sulphates, sodium lauryl sulphate, alkylglucamides, and dialkyl sulphosuccinates, and at least one agrochemical active.

According to a fourth aspect of the present invention there is provided an aqueous formulation comprising:

i) lecithin;

ii) optionally a dispersant selected from the group comprising sucrose ester, alkylpolyglucoside, alkylnaphthalene sulphonates, phosphate ester, sorbitol ester, polyglycerol ester, alkyl sulphates, sodium lauryl sulphate, alkylglucamides, and dialkyl sulphosuccinates;

iii) at least one agrochemical active; and iv) electrolyte.

According to a fifth aspect of the present invention there is provided an aqueous formulation comprising dilution of the concentrate of the first aspect in an electrolyte.

According to a sixth aspect there is provided an end use agrochemical formulation formed by dilution of the aqueous formulation of the fourth aspect.

According to a seventh aspect of the present invention there is provided the use of lecithin to form a stable suspension concentrate.

According to an eighth aspect of the present invention there is provided a pre-blend of lecithin and a dispersant selected from selected from the group comprising sucrose ester, alkylpolyglucoside, alkylnaphthalene sulphonates, phosphate ester, sorbitol ester, polyglycerol ester, alkyl sulphates, sodium lauryl sulphate, alkylglucamides, and dialkyl sulphosuccinates; suitable for use in the concentrate of the first aspect.

According to a ninth aspect of the present invention there is provided a method of treating vegetation to control pests, the method comprising applying the formulation of the fourth aspect or the diluted formulation of the sixth aspect, either to said vegetation or to the immediate environment of said vegetation.

DETAILED DESCRIPTION OF EMBODIMENTS OF THE INVENTION

It has been found that the use of lecithin and optional dispersant provide for particularly stable agrochemical concentrates, especially when combined with electrolyte components in a formulation.

As used herein, the terms 'for example,' 'for instance,' 'such as,' or 'including' are meant to introduce examples that further clarify more general subject matter. Unless otherwise specified, these examples are provided only as an aid for understanding the applications illustrated in the present disclosure, and are not meant to be limiting in any fashion.

Lecithin is a by-product obtained from vegetable oil refining. Lecithin is a polar lipid chiefly including phospholipids. A typical crude soybean lecithin contains about 50% of mixed phospholipids (i.e., (phosphatidyl choline (PC), phosphatidyl ethanolamine (PE), phosphatidylserine (PS), and phosphatidyl inositol (PI)), about 34% triglycerides, glycolipids, carbohydrates, and other minor ingredients.

Lecithin can be obtained in fluid and deoiled form. The deoiled lecithin has high phospholipids, is substantially free of any oils.

Lecithin has the advantage of being a renewable emulsifier and can be used to improve the carbon foot print of formulations to which it's added.

The lecithin used in the present invention may be solvent extracted or enzymatically hydrolysed lecithin.

Preferably the lecithin used in the present invention is de-oiled lecithin.

The lecithin used may be fractionated de-oiled lecithin, and preferably the fractions used may be those enriched in phosphatidylinositol and acid. Preferably the fraction used would be the ethanol insoluble fraction.

The dispersant may optionally be present in the concentrate, and if present is selected from the group comprising sucrose ester, alkylpolyglucoside, alkylnaphthalene sulphonates, phosphate ester, sorbitol ester, polyglycerol ester, alkyl sulphates, sodium lauryl sulphate, alkylglucamides, and dialkyl sulphosuccinates.

Preferred dispersants may be selected from alkylpolyglucoside, phosphate esters, and sucrose esters. Especially preferred dispersants may be alkylpolyglucoside.

Where alkylpolyglucoside are used they may be of varying alkyl chain lengths. Preferred alkyl chain lengths may be C8 to C10, or C9 to C11.

The lecithin and dispersant may be mixed and formed in to a blend or pre-blend form prior to forming in to a concentrate formulation. The blend may then be stored for some time prior to concentrate formation.

In the blend form the amount of lecithin present is in the range from 35 wt. % to 65 wt. %. More preferably, in the range from 40 wt. % to 60 wt. %. Further preferably, in the range from 45 wt. % to 55 wt. %.

In the blend form the amount of dispersant present is in the range from 20 wt. % to 50 wt. %. More preferably, in the range from 25 wt. % to 45 wt. %. Further preferably, in the range from 30 wt. % to 40 wt. %.

The blend may comprise a solvent. Where present, the solvent may comprise a single solvent or a mixture of two or more solvents. Suitable solvents may be selected from water, monohydric alcohols, such as methanol, ethanol, propanols, butanols, benzyl alcohol, or polyhydric alcohols such as ethylene glycol, diethylene glycol, propylene glycol, or glycerol, or polyglycols such as polyethylene, polypropylene, or mixed polyalkylene glycols (PAGs).

If present, the amount of solvent present is in the range from 10 wt. % to 60 wt. %. More preferably, in the range from 15 wt. % to 50 wt. %. Further preferably, in the range from 20 wt. % to 40 wt. %. Even further preferably, in the range from 25 wt. % to 35 wt. %. If solvent is present the amount of dispersant and lecithin combined in the pre-blend would form the remaining amount.

Agrochemical concentrates are agrochemical compositions, which may be aqueous or non-aqueous, and which are designed to be diluted with water (or other liquid) to form the corresponding end-use agrochemical formulations, typically spray formulations. Said concentrates include those in liquid form (such as solutions, emulsions, or dispersions) and in solid form (especially in water dispersible solid form) such as granules or powders.

Accordingly, the concentrate of the present invention may be formulated as an emulsion concentrate (EW), suspension concentrate (SC), as an oil-based suspension concentrate (OD), and/or suspoemulsions (SE). In an OD, SC, or SE formulations the active compound may be present as a solid or emulsified liquid. It is envisaged that the present invention will particularly find use in SC formulations.

It will be appreciated that typically SC formulations are water based, where the continuous phase is instead formed by water.

The benefits of the present invention are that stable suspension concentrates can be achieved.

The concentrate may have an aqueous continuous phase, and may be at least 40 wt. % aqueous. More preferably, at least 48 wt. %. Further preferably, at least 54 wt. %. Even further preferably, at least 60 wt. %.

The lecithin may be present in the concentrate in an amount between 1.0 wt. % and 15 wt. %. More preferably, between 2.0 wt. % and 12 wt. %. Further preferably, between 3.0 wt. % and 8 wt. %. Even further preferably, between 3.5 wt. % and 7 wt. %.

The dispersant may be present in the concentrate in an amount between 0.8 wt. % and 14 wt. %. More preferably, between 1.2 wt. % and 11 wt. %. Further preferably, between 2.2 wt. % and 7 wt. %. Even further preferably, between 3.0 wt. % and 6 wt. %.

The dispersant of the present invention will typically be used in an amount proportional to the amount of the lecithin in the concentrate. The ratio of dispersant to lecithin in the concentrate is preferably at a weight ratio of about 0.5-4:1. More preferably, about 0.5-1.5:1. Most preferably, about 0.6-0.8:1. It will be understood that this ratio of dispersant to lecithin would apply to the pre-blend, and will generally be maintained for concentrates and in the agrochemical spray formulations.

The lecithin of the present invention provide for desired stability of the resulting concentrates. The concentrates do not undergo separation under storage. Additionally, the concentrates return to being homogeneous liquids at room temperature after being frozen.

The agrochemical active may preferably be a solid phase agrochemical active. Solid agrochemical active compounds are to be understood in the present composition as meaning all substances customary for plant treatment, whose melting point is above 20° C. (standard pressure). Solid agrochemical actives will also include insoluble active ingredients, i.e. active ingredients whose solubility in water is such that a significant solid content exists in the concentrate after addition.

Agrochemical actives refer to biocides which, in the context of the present invention, are plant protection agents, more particular chemical substances capable of killing different forms of living organisms used in fields such as medicine, agriculture, forestry, and mosquito control. Also counted under the group of biocides are so-called plant growth regulators.

Biocides for use in agrochemical formulations of the present invention are typically divided into two sub-groups:

pesticides, including fungicides, herbicides, insecticides, algicides, moluscicides, miticides and rodenticides, and antimicrobials, including germicides, antibiotics, antibacterials, antivirals, antifungals, antiprotozoals and antiparasites.

In particular, biocides selected from insecticides, fungicides, or herbicides may be particularly preferred.

The term 'pesticide' will be understood to refer to any substance or mixture of substances intended for preventing, destroying, repelling, or mitigating any pest. A pesticide may be a chemical substance or biological agent (such as a virus or bacteria) used against pests including insects, plant pathogens, weeds, mollusks, birds, mammals, fish, nematodes (roundworms) and microbes that compete with humans for food, destroy property, spread disease or are a nuisance. In the following examples, pesticides suitable for the agrochemical compositions according to the present invention are given.

A fungicide is a chemical control of fungi. Fungicides are chemical compounds used to prevent the spread of fungi in gardens and crops. Fungicides are also used to fight fungal infections. Fungicides can either be contact or systemic. A contact fungicide kills fungi when sprayed on its surface. A systemic fungicide has to be absorbed by the fungus before the fungus dies.

Examples for suitable fungicides, according to the present invention, encompass the following species: (3-ethoxypropyl)mercury bromide, 2-methoxyethylmercury chloride, 2-phenylphenol, 8-hydroxyquinoline sulphate, 8-phenylmercuri oxyquinoline, acibenzolar, acylamino acid fungicides, acypetacs, aldimorph, aliphatic nitrogen fungicides, allyl alcohol, amide fungicides, ampropylfos, anilazine, anilide fungicides, antibiotic fungicides, aromatic fungicides, aureofungin, azaconazole, azithiram, azoxystrobin, barium polysulphide, benalaxyl-M, benodanil, benomyl, benquinox, bentaluron, benthiavalicarb, benzalkonium chloride, benzamacril, benzamide fungicides, benzamorf, benzanilide fungicides, benzimidazole fungicides, benzimidazole precursor fungicides, benzimidazolylcarbamate fungicides, benzohydroxamic acid, benzothiazole fungicides, bethoxazin, binapacryl, biphenyl, bitertanol, bithionol, blasticidin-S, Bordeaux mixture, boscalid, bridged diphenyl fungicides, bromuconazole, bupirimate, Burgundy mixture, buthiobate, butylamine, calcium polysulphide, captafol, captan, carbamate fungicides, carbamorph, carbanilate fungicides, carbendazim, carboxin, carpropamid, carvone, Cheshunt mixture, chinomethionat, chlobenthiazone, chloraniformethan, chloranil, chlorfenazole, chlorodinitronaphthalene, chloroneb, chloropicrin, chlorothalonil, chlorquinox, chlozolinate, ciclopirox, climbazole, clotrimazole, conazole fungicides, conazole fungicides (imidazoles), conazole fungicides (triazoles), copper(II) acetate, copper (II) carbonate, basic, copper fungicides, copper hydroxide, copper naphthenate, copper oleate, copper oxychloride, copper(II) sulphate, copper sulphate, basic, copper zinc chromate, cresol, cufraneb, cuprobam, cuprous oxide, cyazofamid, cyclafuramid, cyclic dithiocarbamate fungicides, cycloheximide, cyflufenamid, cymoxanil, cypendazole, cyproconazole, cyprodinil, dazomet, DBCP, debacarb, decafentin, dehydroacetic acid, dicarboximide fungicides, dichlofluanid, dichlone, dichlorophen, dichlorophenyl, dicarboximide fungicides, dichlozoline, diclobutrazol, diclocymet, diclomezine, dicloran, diethofencarb, diethyl pyrocarbonate, difenoconazole, diflumetorim, dimethirimol, dimethomorph, dimoxystrobin, diniconazole, dinitrophenol fungicides, dinobuton, dinocap, dinocton, dinopenton, dinosulphon, dinoterbon, diphenylamine, dipyrithione, disulphiram, ditalimfos, dithianon, dithiocarbamate fungicides, DNOC, dodemorph, dodicin, dodine, DONATODINE, drazoxolon, edifenphos, epoxiconazole, etaconazole, etem, ethaboxam, ethirimol, ethoxyquin, ethylmercury 2,3-dihydroxypropyl mercaptide, ethylmercury acetate, ethylmercury bromide, ethylmercury chloride, ethylmercury phosphate, etridiazole, famoxadone, fenamidone, fenaminosulph, fenapanil, fenarimol, fenbuconazole, fenfuram, fenhexamid, fenitropan, fenoxanil, fenpiclonil, fenpropidin, fenpropimorph, fentin, ferbam, ferimzone, fluazinam, fludioxonil, flumetover, fluopicolide, fluoroimide, fluotrimazole, fluoxastrobin, fluquinconazole, flusilazole, flusulphamide, flutolanil, flutriafol, folpet, formaldehyde, fosetyl, fuberidazole, furalaxyl, furametpyr, furamide fungicides, furanilide fungicides, furcarbanil, furconazole, furconazole-cis, furfural, furmecyclox, furophanate, glyodin, griseofulvin, guazatine, halacrinate, hexachlorobenzene, hexachlorobutadiene, hexachlorophene, hexaconazole, hexylthiofos, hydrargaphen, hymexazol, imazalil, imibenconazole, imidazole fungicides, iminoctadine, inorganic fungicides, inorganic mercury fungicides, iodomethane, ipconazole, iprobenfos, iprodione, iprovalicarb, isoprothiolane, isovaledione, kasugamycin, kresoxim-methyl, lime sulphur, mancopper, mancozeb, maneb, mebenil, mecarbinzid, mepanipyrim, mepronil, mercuric chloride, mercuric oxide, mercurous chloride, mercury fungicides, metalaxyl, metalaxyl-M, metam, metazoxolon, metconazole, methasulphocarb, methfuroxam, methyl bromide, methyl isothiocyanate, methylmercury benzoate, methylmercury dicyandiamide, methylmercury pentachlorophenoxide, metiram, metominostrobin, metrafenone, metsulphovax, milneb, morpholine fungicides, myclobutanil, myclozolin, N-(ethylmercury)-p-toluenesulphonanilide, nabam, natamycin, nitrostyrene, nitrothal-isopropyl, nuarimol, OCH, octhilinone, ofurace, organomercury fungicides, organophosphorus fungicides, organotin fungicides, orysastrobin, oxadixyl, oxathiin fungicides, oxazole fungicides, oxine copper, oxpoconazole, oxycarboxin, pefurazoate, penconazole, pencycuron, pentachlorophenol, penthiopyrad, phenylmercuriurea, phenylmercury acetate, phenylmercury chloride, phenylmercury derivative of pyrocatechol, phenylmercury nitrate, phenylmercury salicylate, phenylsulphamide fungicides, phosdiphen, phthalide, phthalimide fungicides, picoxystrobin, piperalin, polycarbamate, polymeric dithiocarbamate fungicides, polyoxins, polyoxorim, polysulphide fungicides, potassium azide, potassium polysulphide, potassium thiocyanate, probenazole, prochloraz, procymidone, propamocarb, propiconazole, propineb, proquinazid, prothiocarb, prothioconazole, pyracarbolid, pyraclostrobin, pyrazole fungicides, pyrazophos, pyridine fungicides, pyridinitril, pyrifenox, pyrimethanil, pyrimidine fungicides, pyroquilon, pyroxychlor, pyroxyfiir, pyrrole fungicides, quinacetol, quinazamid, quinconazole, quinoline fungicides, quinone fungicides, quinoxaline fungicides, quinoxyfen, quintozene, rabenzazole, salicylanilide, silthiofam, simeconazole, sodium azide, sodium orthophenylphenoxide, sodium pentachlorophenoxide, sodium polysulphide, spiroxamine, streptomycin, strobilurin fungicides, sulphonanilide fungicides, sulphur, sultropen, TCMTB, tebuconazole, tecloftalam, tecnazene, tecoram, tetraconazole, thiabendazole, thiadifluor, thiazole fungicides, thicyofen, thifluzamide, thiocarbamate fungicides, thiochlorfenphim, thiomersal, thiophanate, thiophanate-methyl, thiophene fungicides, thioquinox, thiram, tiadinil, tioxymid, tivedo, tolclofos-methyl, tolnaftate, tolylfluanid, tolylmercury acetate, triadimefon, triadimenol, triamiphos, triarimol, triazbutil, triazine fungicides, triazole fungicides, triazoxide, tributyltin oxide, trichlamide, tricyclazole, trifloxystrobin, triflumizole, triforine, triticonazole, unclassified fungicides, undecylenic acid, uniconazole, urea fungicides, validamycin, valinamide fungicides, vinclozolin, zarilamid, zinc naphthenate, zineb, ziram, zoxamide, and mixtures thereof.

An herbicide is a pesticide used to kill unwanted plants. Selective herbicides kill specific targets while leaving the desired crop relatively unharmed. Some of these act by interfering with the growth of the weed and are often based on plant hormones. Herbicides used to clear waste ground are non-selective and kill all plant material with which they come into contact. Herbicides are widely used in agriculture and in landscape turf management. They are applied in total vegetation control (TVC) programs for maintenance of highways and railroads. Smaller quantities are used in forestry, pasture systems, and management of areas set aside as wildlife habitat.

Suitable herbicides may be selected from the group comprising: aryloxycarboxylic acid e.g. MCPA, aryloxyphenoxypropionates e.g. clodinafop, cyclohexanedione oximes e.g. sethoxydim, dinitroanilines e.g. trifluralin, diphenyl ethers e.g. oxyfluorfen, hydroxybenzonitriles e.g. bromoxynil, sulphonylureas e.g. nicosulphuron, triazolopyrimidines e.g. penoxsulam, triketiones e.g. mesotriones, or ureas e.g. diuron.

An insecticide is a pesticide used against insects in all developmental forms, and includes ovicides and larvicides used against the eggs and larvae of insects. Insecticides are used in agriculture, medicine, industry and the household.

Suitable insecticides may include those selected from:

- Chlorinated insecticides such as, for example, Camphechlor, DDT, Hexachloro-cyclohexane, gamma-Hexachlorocyclohexane, Methoxychlor, Pentachlorophenol, TDE, Aldrin, Chlordane, Chlordecone, Dieldrin, Endosulphan, Endrin, Heptachlor, Mirex and their mixtures;
- Organophosphorous compounds such as, for example, Acephate, Azinphos-methyl, Bensulide, Chlorethoxyfos, Chlorpyrifos, Chlorpyriphos-methyl, Diazinon, Dichlorvos (DDVP), Dicrotophos, Dimethoate, Disulphoton, Ethoprop, Fenamiphos, Fenitrothion, Fenthion, Fosthiazate, Malathion, Methamidophos, Methidathion, Methyl-parathion, Mevinphos, Naled, Omethoate, Oxydemeton-methyl, Parathion, Phorate, Phosalone, Phosmet, Phostebupirim, Pirimiphos-methyl, Profenofos, Terbufos, Tetrachlorvinphos, Tribufos, Trichlorfon and their mixture;
- Carbamates such as, for example, Aldicarb, Carbofuran, Carbaryl, Methomyl, 2-(I-Methylpropyl)phenyl methylcarbamate and their mixtures;
- Pyrethroids such as, for example, Allethrin, Bifenthrin, Deltamethrin, Permethrin, Resmethrin, Sumithrin, Tetramethrin, Tralomethrin, Transfluthrin and their mixtures;
- Plant toxin derived compounds such as, for example, Derris (rotenone), Pyrethrum, Neem (Azadirachtin), Nicotine, Caffeine and their mixtures.
- Neonicotinoids such as imidacloprid.
- Abamectin e.g. emamactin
- Oxadiazines such as indoxacarb
- Anthranilic diamides such as rynaxypyr Rodenticides are a category of pest control chemicals intended to kill rodents. Suitable rodenticides may include anticoagulants, metal phosphides, phosphides, and calciferols (vitamins D), and derivatives thereof.

Miticides are pesticides that kill mites. Antibiotic miticides, carbamate miticides, formamidine miticides, mite growth regulators, organochlorine, permethrin and organophosphate miticides all belong to this category. Molluscicides are pesticides used to control mollusks, such as moths, slugs and snails. These substances include metaldehyde, methiocarb and aluminium sulphate. A nematicide is a type of chemical pesticide used to kill parasitic nematodes (a phylum of worm).

Bactericidal disinfectants may include those selected from active chlorines, active oxygen, iodine, concentrated alcohols, phenolic substances, cationic surfactants, strong oxidisers, heavy metals and their salts, and concentrated strong acids and alkalis between pH of from 1 to 13. Suitable antiseptics (i.e., germicide agents that can be used on human or animal body, skin, mucoses, wounds and the like) may include diluted chlorine preparations, iodine preparations, peroxides, alcohols with or without antiseptic additives, weak organic acids, phenolic compounds, and cation-active compounds.

Preferred actives are those with systemic or partially systemic mode of action.

Particular preference is given to fungicides such as triazole fungicides (for example prothioconazole) strobilurin fungicides (for example azoxystrobin), pyrethroid insecticides such as Bifenthrin, and neonicotinoids such as imidacloprid.

The concentration of the agrochemical active in the concentrate is not critical for the purposes of the present invention, and may be determined by other factors as required. The concentration of the agrochemical active is preferably in the range from 10 g/l to 720 g/l. More preferably, in the range from 60 g/l to 400 g/l. Most preferably, in the range from 100 g/l to 300 g/l.

The electrolyte may typically be selected from a fertiliser, particularly a water soluble inorganic fertiliser.

Among water soluble fertilisers that for electrolyte solutions in water are the common water soluble inorganic fertilisers that provide nutrients such as nitrogen, phosphorus, potassium or sulphur. Examples of such fertilisers include:

- for nitrogen as the nutrient:
  - nitrates and or ammonium salts such as ammonium nitrate, calcium ammonium nitrate (in the solid form: $[Ca(NO_3)_2]_5 \cdot NH_4(NO_3)_2 \cdot 10H_2O$), ammonium sulphate nitrate, ammonium phosphates, particularly mono-ammonium phosphate ($NH_4H_2PO_4$), di-ammonium phosphate ($[NH_4]_2HPO_4$), and ammonium polyphosphate, ammonium sulphate, and the less commonly used calcium nitrate, sodium nitrate, potassium nitrate and ammonium chloride;
- for potassium as the nutrient:
  - potassium chloride, potassium sulphate, for example as the mixed sulphate with magnesium ($K_2SO_4 \cdot MgSO_4$), potassium phosphates, particularly potassium dihydrogen phosphate ($KH_2PO_4$) and potassium polyphosphate (commonly given the formula $(KPO_2)_x$) and less commonly potassium nitrate;
- for phosphorus as the nutrient:
  - acidic forms of phosphorus such as phosphoric, pyrophosphoric or polyphosphoric acids can be used, but are not particularly preferred because of their acidity and corrosiveness, and salt forms will usually be preferred such as ammonium phosphates, particularly mono-ammonium phosphate, di-ammonium phosphate, and ammonium polyphosphate, potassium phosphates, particularly potassium dihydrogen phosphate and potassium polyphosphate;

for sulphur as the nutrient:

ammonium sulphate and potassium sulphate, e.g. the mixed sulphate with magnesium.

Particularly preferred liquid fertilisers may have a mixture of one or more of N, P, and K. Especially preferred fertilisers may have a combination of 10% N, 34% P, and the remained of water.

Generally, it is particularly useful to make the fertiliser as a premixed aqueous solution of the water soluble electrolyte agrochemicals as near as is practically possible to their saturation concentration at about 20° C.

In such a aqueous premixed form the concentration of the water soluble electrolyte agrochemical will typically be at least 5% for materials that are less soluble in water such as triammonium phosphate and up to 50% by weight for more water soluble materials e.g. urea and/or ammonium nitrate. Generally the concentration will be close to saturation as this gives the highest concentration of this material in the liquid fertiliser. The saturation concentration (usually between 0 and 50° C.) in combination with the amount of water included in the formulation determine the amount of water soluble electrolyte agrochemical.

Typically the concentration of electrolyte in the premixed composition is from 30 to 75%, more usually 40 to 70%, particularly 50 to 68% by weight of the total composition.

Other water soluble nutrient containing compounds (commonly identified as "micronutrients") may also be included in the compositions e.g. to provide minor or trace nutrients to the formulation. Similarly, water soluble buffering and chelating agents such as ammonium and alkali metal citrates, gluconates, lactates, and polyacrylates may be included as part or all of the electrolyte component of the formulation.

It is envisaged that the concentrate is added in to the electrolyte, and this may be done by adding concentrate to a liquid fertiliser. Typically the amount of concentrate added to a fertiliser would be in the ratio of 0.1-5:8-20, where said ratios are expressed in volume.

In the formulation the amount of concentrate typically included will be in the range from 0.1 to 10%, more usually, 0.15 to 5%, particularly 0.2 to 2% by weight based on the concentrate.

In the formulation the amount of fertiliser typically included will be in the range from 1 to 50%, more usually, 5 to 40%, particularly 5 to 35% by weight based on the concentrate.

It has been found that use of lecithin in formulations with electrolyte fertilisers provides excellent stability over time and at various temperatures. In particular the formulation remains stable during a period of half an hour being the typical period between forming the formulation and applying it to the vegetation.

The formulations of the present invention, may have a change in separation of no more than 20%, and preferably not more than 15% at, over a period of half an hour at 25° C.

The formulation may be diluted to form an end-use formulation, typically spray formulations. However it should be understood that the formulation may be used in an undiluted form.

Where the formulation is diluted this may be with water at from 1 to 10,000, particularly 10 to 1,000, times the total weight of the formulation to form the spray formulation.

Said formulation may be diluted for use resulting in a dilute composition having an agrochemical active concentration of about 0.5 wt. % to about 1.5 wt. %. In said dilute composition (for example, a spray formulation, where a spray application rate may be from 10 to 500 $l\cdot ha^{-1}$) the agrochemical active concentration may be in the range from about 0.001 wt. % to about 1 wt. % of the total formulation as sprayed.

Spray formulations are aqueous agrochemical formulations including all the components which it is desired to apply to the plants or their environment. Spray formulations can be made up by simple dilution of the undiluted formulation containing desired components (other than water), or by mixing of the individual components, or a combination of diluting a formulation and adding further individual components or mixtures of components. Typically such end use mixing is carried out in the tank from which the formulation is sprayed, or alternatively in a holding tank for filling the spray tank. Such mixing and mixtures are typically termed tank mixing and tank mixtures.

Where the agrochemical active is present in the aqueous end use formulation as solid particles, most usually it will be present as particles mainly of active agrochemical. However, if desired, the active agrochemical can be supported on a solid carrier e.g. silica or diatomaceous earth, which can be a solid support, filler or diluent material.

The spray formulations will typically have a pH within the range from moderately acidic (e.g. about 3) to moderately alkaline (e.g. about 10), and particular near neutral (e.g. about 5 to 8). More concentrated formulations will have similar degrees of acidity/alkalinity, but as they may be largely non-aqueous, pH is not necessarily an appropriate measure of this.

The agrochemical formulation may include solvents (other than water) such as monopropylene glycol, oils which can be vegetable or mineral oils such as spray oils. Such solvents may be included as a solvent for the surfactant adjuvant, and/or as a humectant, e.g. especially propylene glycol. When used such solvents will typically be included in an amount of from 5 wt. % to 500 wt. %, desirably 10 wt. % to 100 wt. %, by weight of the surfactant adjuvant. Such combinations can also include salts such as ammonium chloride and/or sodium benzoate, and/or urea especially as gel inhibition aids.

The concentrate and/or agrochemical formulation may also include:

- preservatives and/or anti-microbials such as organic acids, or their esters or salts such as ascorbic e.g. ascorbyl palmitate, sorbic e.g. potassium sorbate, benzoic e.g. benzoic acid and methyl and propyl 4-hydroxybenzoate, propionic e.g. sodium propionate, phenol e.g. sodium 2-phenylphenate; 1,2-benzisothiazolin-3-one; or formaldehyde as such or as paraformaldehyde; or inorganic materials such as sulphurous acid and its salts, typically in amounts of 0.01 wt. % to 1 wt. % of the composition; and/or
- antifoam agents e.g. polysiloxane antifoam agents, typically in amounts of 0.005 wt. % to 1 wt. % of the composition.

Other adjuvants, particularly surfactant adjuvants, may be included in the compositions and formulations of and used in this invention. Examples include alkylpolysaccharides (more properly called alkyl oligosaccharides); fatty amine ethoxylates e.g. coconut alkyl amine 2EO; sorbitan and sorbitol ethoxylate derivatives, such as those sold under the trade names Atlox and Tween by Croda Europe Limited; and derivatives of alk(en)yl succinic anhydride, in particular those described in PCT applications WO 94/00508 and WO 96/16930, which are incorporated herein by reference.

The concentrate and/or agrochemical formulation may also include other components as desired. These other components may be selected from those including:

binders, particularly binders which are readily water soluble to give low viscosity solutions at high binder concentrations, such as polyvinylpyrrolidone; polyvinyl alcohol; carboxymethyl cellulose; gum arabic; sugars e.g. sucrose or sorbitol; starch; ethylene-vinyl acetate copolymers, sucrose and alginates, diluents, absorbents or carriers such as carbon black; talc; diatomaceous earth; kaolin; aluminium, calcium or magnesium stearate; sodium tripolyphosphate; sodium tetraborate; sodium sulphate; sodium, aluminium and mixed sodium-aluminium silicates; and sodium benzoate, disintegration agents, such as surfactants, materials that swell in water, for example carboxy methylcellulose, collodion, polyvinylpyrrolidone and microcrystalline cellulose swelling agents; salts such as sodium or potassium acetate, sodium carbonate, bicarbonate or sesquicarbonate, ammonium sulphate and dipotassium hydrogen phosphate;

wetting agents such as alcohol ethoxylate and alcohol ethoxylate/propoxylate wetting agents;

dispersants such as sulphonated naphthalene formaldehyde condensates and acrylic copolymers such as the comb copolymer having capped polyethylene glycol side chains on a polyacrylic backbone, or polymeric dispersants such as styrene acrylate copolymers or styrene acrylate AMPS copolymers (for example Metasperse 100L/Metasperse 500L available from Croda Europe Ltd), Lignin sulfonates, naphthalene sulfonate formaldehyde condensates;

viscosity/rheology modifiers such as commercially available water soluble or miscible gums, e.g. xanthan gums, and/or cellulosics, e.g. carboxy-methyl, ethyl or propylcellulose; and/or attapulgite clay, bentonite clay, fumed silica, fumed alumina, or fumed mixed silica/alumina.

emulsifiers such as alcohol ethoxylates, ABA block co polymers, or castor oil ethoxylates;

antifoam agents, e.g. polysiloxane antifoam agents, typically in amounts of 0.005 wt. % to 10 wt. % of the formulation;

preservatives and/or anti-microbials such as organic acids, or their esters or salts such as ascorbic e.g. ascorbyl palmitate, sorbic e.g. potassium sorbate, benzoic e.g. benzoic acid and methyl and propyl 4-hydroxybenzoate, propionic e.g. sodium propionate, phenol e.g. sodium 2-phenylphenate; 1,2-benzisothiazolin-3-one; or formaldehyde as such or as paraformaldehyde; or inorganic materials such as sulphurous acid and its salts, typically in amounts of 0.01 wt. % to 1 wt. % of the formulation.

The invention further includes a method of treating plants using agrochemical formulation or diluted formulation of the present invention.

Accordingly the invention further includes a method of treating vegetation to control pests, the method comprising applying the formulation or diluted formulation of the present invention, either to said vegetation or to the immediate environment of said vegetation.

The lecithin of the present invention provide for desired stability of the resulting agrochemical concentrate and formulations. The formulations do not undergo separation under storage.

All of the features described herein may be combined with any of the above aspects, in any combination.

In order that the present invention may be more readily understood, reference will now be made, by way of example, to the following description.

It will be understood that all tests and physical properties listed have been determined at atmospheric pressure and room temperature (i.e. 20° C.), unless otherwise stated herein, or unless otherwise stated in the referenced test methods and procedures.

The following compounds were used in the examples shown herein:

AL-2559—C9-11 alkylpolyglucoside, 50% active
De-oiled lecithin—90% acetone insoluble soy lecithin, Alfa Aesar
Multitrope 1214—polyoxyethylene alkyl ether phosphate
AL-2575—C8-10 alkylpolyglucoside, 70% active
Metasperse 500L—styrene acrylic copolymer dispersant
Epikuron 200—92% soy phosphatidylcholine, Cargill
40% PC—phosphatidylcholine enriched de-oiled lecithin, Avanti Polar Lipids
20% PC—de-oiled soy lecithin, Avanti Polar Lipids
Ethanol insoluble fraction of 20% PC
Lecigran 1000P—de-oiled soy lecithin, Cargill
Lecimulthin 150IP—de-oiled, enzymatically hydrolysed soy lecithin
Ultralec P—de-oiled soy lecithin, ADM
Attaflow FL—suspension of attapulgite clay in water (21% solids)

Example 1—Atrazine Suspension Concentrate

Three suspension concentrates were formed using atrazine as the active. Prior to inclusion in to suspensions for compatibility testing, atrazine was air milled using a 02-612 Micron-Master Jet Pulveriser. The technical was fed to the mill using a Syntron® Vibrating Feeder. The air mill injector nozzle air pressure was ~90 psi and the grinding air pressure was ~70-80 psi. A lower grinding pressure was necessary to reduce the amount of product rejected while being introduced to the grinding chamber.

Typical particle size distribution values were $D_{10}$ of 1.0 μm (stdev 0.08), $D_{50}$ of 2.2 μm (stdev 0.02), and $D_{90}$ of 4.8 μm (stdev 0.08).

Concentrates containing air milled atrazine were prepared according to the invention. To prepare 20 ml of suspension concentrate (SC), formulation blanks were prepared by adding the requisite amount of water to a 2 oz jar. While stirring, with a magnetic stir bar, the requisite amount of dispersant, 0.02 g SAG1572, 0.02 g Proxel GXL, and 1.28 g propylene glycol were added. Stirring was continued until a homogenous mixture was achieved. 4.79 g of air milled atrazine was then added and stirred to wet into the blank. After the atrazine was incorporated into the blank, the formulation was mixed with a Silverson LR4 homogeniser, equipped with a ¾" tubular mixing head, at 10,000 rpm for one minute.

The following three concentrates (C1 to C3) were formed as shown in Table 1.

TABLE 1

Suspension concentrates (values all weight percentages)

| Ingredient | C1 | C2 | C3 |
| --- | --- | --- | --- |
| Atrazine | 22.5 | 22.5 | 22.5 |
| AL-2559 | 4 | 0 | 4 |
| De-oiled Lecithin | 4 | 4 | 2 |

TABLE 1-continued

| Suspension concentrates (values all weight percentages) | | | |
|---|---|---|---|
| Ingredient | C1 | C2 | C3 |
| Multitrope 1214 | 0 | 2 | 2 |
| SAG 1572 | 0.1 | 0.1 | 0.1 |
| Proxel GXL | 0.1 | 0.1 | 0.1 |
| Propylene Glycol | 6 | 6 | 6 |
| Water | 63.3 | 65.3 | 63.3 |

Fertiliser Compatibility Testing

To test compatibility of the suspension with fertiliser, 1 ml of the formed concentrates (C1, C2, and C3) were added to 10 g of fertiliser. The mixture was inverted 10 times to mix the suspension into the fertiliser. The quality of the dispersion was assessed immediately after mixing and after sitting undisturbed for 30 minutes. After assessing the dispersion quality, the sample was poured through a 50 mesh screen and the amount of residue retained assessed.

The fertilisers used are shown below (values are all expressed as weight percentages):

F1—10-34-0 Ammonium Polyphosphate
- Total nitrogen—10.0% (10.0% ammoniacal nitrogen)
- Available phosphate (as $P_2O_5$)—34.0%
- Iron (Fe)—0.50%
- 12 lbs/gal, pH—5.5-6.5

F2—26-1-4, 75% MSN
- Total nitrogen—26.0% (0.30% ammoniacal nitrogen, 10.10% urea, 15.60% slowly available water soluble nitrogen)
- Available phosphate (as $P_2O_5$)—1.0%
- Soluble potash ($K_2O$)—4.0%
- 10.6 lbs/gal, pH—10.5

F3—12-0-12, 50% SRN
- Total nitrogen—12.0% (6.0% urea, 6.0% slowly available water soluble nitrogen)
- Soluble potash ($K_2O$)—12.0%
- Sulphur (S)—1.5%
- Boron (B)—0.05%
- Copper (Cu)—0.05%
- Iron (Fe)—0.10%
- Manganese (Mn)—0.05%
- Zinc (Zn)—0.05%
- 10.7 lbs/gal, pH—10.9

F4—8-16-8, 2% Sulphur Starter/Transplant Solution
- Total nitrogen—8.0% (5.50% ammoniacal nitrogen, 0.80% nitrate, 1.70% urea)
- Available phosphate (as $P_2O_5$)—16.0%
- Soluble potash ($K_2O$)—8.0%
- Sulphur (S)—2.0%
- 10.8 lbs/gal, pH—6.5-7.0

F5—Redline 6-12-2 (West Central)
- Total nitrogen—6.0%
- Available phosphate (as $P_2O_5$)—12.0%
- Soluble potash ($K_2O$)—2.0%
- Zinc (Zn)—1.0%
- Iron (Fe)—0.3%
- Manganese (Mn)—0.04%
- Copper (Cu)—0.05%
- 10 lbs/gal, pH—6.0-6.8

F6—32-0-0 Urea Ammonium Nitrate (Lab Prepared)
- Total nitrogen—32.0% (7.75% ammoniacal nitrogen, 7.75% nitrate nitrogen, 16.50% urea nitrogen)

The formulations of SC in to the fertiliser were formed and the dispersion quality assessed, with results shown in Table 3.

TABLE 3

| Fertiliser compatibility dispersion results | | | | | | | | | | | | |
|---|---|---|---|---|---|---|---|---|---|---|---|---|
| Concentrate | Initial Dispersion | | | | | | Dispersion Quality | | | | | |
| Used | F1 | F2 | F3 | F5 | F4 | F6 | F1 | F2 | F3 | F5 | F4 | F6 |
| C1 | 1 | 1 | 1 | 1 | 1 | 1 | 1 | 1 | 1 | 1 | 1 | 1 |
| C2 | 1 | 1 | 1 | 1 | 1 | 1 | 2 | 1 | 1 | 1 | 1 | 1 |
| C3 | 1 | 1 | 1 | 1 | 1 | 1 | 2 | 1 | 1 | 1 | 1 | 1 |

For the initial dispersion: 1—good dispersion, 2—slight agglomeration, 3—agglomeration.

For the dispersion quality: 1—good dispersion, 2—volume filling floc, 3—sediment or floating floc.

TABLE 4

| Fertiliser compatibility residue results | | | | | | |
|---|---|---|---|---|---|---|
| Concentrate | Residue on 300 μm Screen | | | | | |
| Used | F1 | F2 | F3 | F5 | F4 | F6 |
| C1 | 1 | 1 | 1 | 1 | 1 | 1 |
| C2 | 1 | 1 | 1 | 1 | 1 | 1 |
| C3 | 1 | 1 | 1 | 1 | 1 | 2 |

For the residue: 1—no residue, 2—minimal residue, 3—significant residue, 5—total retention.

As can be seen from the results, the use of de-oiled lecithin provides complete compatibility with all the fertilisers tested. The formulations have good dispersion initially and also after time.

Example 2—In-Situ Milled Actives

Formulations were prepared, according to the invention, by milling the water insoluble active ingredient in-situ. To prepare 40 ml of SC, a formulation blank was prepared by adding the requisite amount of water to a 4 oz jar. While stirring with a magnetic stir bar, the requisite amount of surfactant, 0.04 g SAG1572, 0.04 g Proxel GXL, and 2.34 g propylene glycol were added. Stirring was continued until a homogenous mixture was achieved.

9.59 g of unmilled active ingredient was added and stirred to wet into the blank. After the active ingredient was incorporated into the blank, the formulation was mixed with a Silverson LR4 homogeniser, equipped with a ¾" tubular mixing head, at 10,000 rpm for one minute. After homogenisation, 80 g of milling media (Fox Industries, 0.8-1.0 mm glass beads) was added. The sample was agitated, in an ice bath, with a Talboy 134-1 overhead stirrer at setting 4.5 for 30 minutes. The formulation was separated from the milling media by vacuum filtration using a 150 mesh screen.

The following three concentrates (C4 to C6) were formed as shown in Table 5.

TABLE 5

| Suspension concentrates (values all weight percentages) | | | |
|---|---|---|---|
| Ingredient | C4 | C5 | C6 |
| Atrazine | 22.5 | 0 | 0 |
| Bifenthrin | 0 | 22.5 | 0 |
| Azoxystrobin | 0 | 0 | 22.5 |
| AL-2575 | 4 | 4 | 4 |
| De-oiled Lecithin | 4 | 4 | 4 |

TABLE 5-continued

| Suspension concentrates (values all weight percentages) | | | |
|---|---|---|---|
| Ingredient | C4 | C5 | C6 |
| SAG 1572 | 0.1 | 0.1 | 0.1 |
| Proxel GXL | 0.1 | 0.1 | 0.1 |
| Propylene Glycol | 6 | 6 | 6 |
| Water | 63.3 | 63.3 | 63.3 |

The concentrates were then formed in to formulations and included in to fertilisers in the same way as Example 1. The results are shown in Tables 5 and 6.

TABLE 6

| Fertiliser compatibility dispersion results for in-situ milled active | | | | | | | | | | | | |
|---|---|---|---|---|---|---|---|---|---|---|---|---|
| Concentrate | Initial Dispersion | | | | | | Dispersion Quality | | | | | |
| Used | F1 | F2 | F3 | F5 | F4 | F6 | F1 | F2 | F3 | F5 | F4 | F6 |
| C4 | 1 | 1 | 1 | 1 | 1 | 1 | 1 | 1 | 1 | 1 | 1 | 1 |
| C5 | 1 | 1 | 1 | 1 | 1 | 1 | 1 | 1 | 1 | 1 | 1 | 1 |
| C6 | 1 | 1 | 1 | 1 | 1 | 1 | 1 | 1 | 1 | 1 | 1 | 1 |

For the initial dispersion: 1—good dispersion, 2—slight agglomeration, 3—agglomeration.

TABLE 7

| Fertiliser compatibility residue results for in-situ milled active | | | | | | |
|---|---|---|---|---|---|---|
| Concentrate | Residue on 300 μm Screen | | | | | |
| Used | F1 | F2 | F3 | F5 | F4 | F6 |
| C4 | 1 | 1 | 1 | 1 | 1 | 1 |
| C5 | 1 | 1 | 1 | 1 | 1 | 1 |
| C6 | 1 | 1 | 1 | 1 | 1 | 1 |

For the residue: 1—no residue, 2—minimal residue, 3—significant residue, 5—total retention.

Samples prepared with a combination of AL-2575 and de-oiled lecithin, with 3 different actives milled in-situ, showed excellent fertiliser compatibility

Example 3—Alternate Lecithins

Suspensions were prepared, according to the invention, with alternate sources of de-oiled lecithin. To prepare 20 ml of suspension, formulation blanks were prepared by adding the requisite amount of water to a 2 oz jar. While stirring, with a magnetic stir bar, the requisite amount of dispersant, 0.02 g SAG1572, 0.02 g Proxel GXL, and 1.28 g propylene glycol were added. Stirring was continued until a homogenous mixture was achieved. 4.79 g of air milled atrazine was then added and stirred to wet into the blank.

After the atrazine was incorporated into the blank, the formulation was mixed with a Silverson LR4 homogeniser, equipped with a ¾" tubular mixing head, at 10,000 rpm for one minute.

The following three concentrates (C7 to C13) were formed as shown in Table 8.

TABLE 8

| Alternate lecithin concentrates (values all weight percentages) | | | | | | | |
|---|---|---|---|---|---|---|---|
| Ingredient | C7 | C8 | C9 | C10 | C11 | C12 | C13 |
| Atrazine | 22.5 | 22.5 | 22.5 | 22.5 | 22.5 | 22.5 | 22.5 |
| AL-2575 | 4 | 4 | 4 | 4 | 4 | 4 | 4 |
| Epikuron 200 | 4 | 0 | 0 | 0 | 0 | 0 | 0 |
| 40% PC | 0 | 4 | 0 | 0 | 0 | 0 | 0 |
| 20% PC | 0 | 0 | 4 | 0 | 0 | 0 | 0 |
| Ethanol insoluble fraction of 20% PC | 0 | 0 | 0 | 4 | 0 | 0 | 0 |
| Lecigran 1000P | 0 | 0 | 0 | 0 | 4 | 0 | 0 |
| Lecimulthin 150IP | 0 | 0 | 0 | 0 | | 4 | 0 |
| Ultralec P | 0 | 0 | 0 | 0 | 0 | 0 | 4 |
| SAG 1572 | 0.1 | 0.1 | 0.1 | 0.1 | 0.1 | 0.1 | 0.1 |
| Proxel GXL | 0.1 | 0.1 | 0.1 | 0.1 | 0.1 | 0.1 | 0.1 |
| Propylene Glycol | 6 | 6 | 6 | 6 | 6 | 6 | 6 |
| Water | 63.3 | 63.3 | 63.3 | 63.3 | 63.3 | 63.3 | 63.3 |

The concentrates were then formed in to formulations and included in to fertilisers in the same way as Example 1. The results are shown in Tables 9 and 10.

TABLE 9

| Fertiliser compatibility dispersion results for alternate lecithin | | | | | | | | | | | | |
|---|---|---|---|---|---|---|---|---|---|---|---|---|
| Concentrate | Initial Dispersion | | | | | | Dispersion Quality | | | | | |
| Used | F1 | F2 | F3 | F5 | F4 | F6 | F1 | F2 | F3 | F5 | F4 | F6 |
| C7 | 2 | 1 | 1 | 1 | 1 | 1 | 2 | 1 | 1 | 2 | 1 | 1 |
| C8 | 1 | 1 | 1 | 1 | 1 | 1 | 1 | 1 | 1 | 1 | 1 | 1 |
| C9 | 1 | 1 | 1 | 1 | 1 | 1 | 1 | 1 | 1 | 1 | 1 | 1 |
| C10 | 1 | 1 | 1 | 1 | 1 | 1 | 1 | 1 | 1 | 1 | 1 | 1 |
| C11 | 1 | 1 | 1 | 1 | 1 | 1 | 1 | 1 | 1 | 1 | 1 | 1 |
| C12 | 1 | 1 | 1 | 1 | 1 | 1 | 1 | 1 | 1 | 1 | 1 | 1 |
| C13 | 1 | 1 | 1 | 1 | 1 | 1 | 1 | 1 | 1 | 1 | 1 | 1 |

For the initial dispersion: 1—good dispersion, 2—slight agglomeration, 3—agglomeration.

TABLE 10

| Fertiliser compatibility residue results for alternate lecithin | | | | | | |
|---|---|---|---|---|---|---|
| Concentrate | Residue on 300 μm Screen | | | | | |
| Used | F1 | F2 | F3 | F5 | F4 | F6 |
| C7 | 3 | 1 | 1 | 1 | 1 | 1 |
| C8 | 1 | 1 | 1 | 1 | 1 | 1 |
| C9 | 1 | 1 | 1 | 1 | 1 | 1 |
| C10 | 1 | 1 | 1 | 1 | 1 | 1 |
| C11 | 1 | 1 | 1 | 1 | 1 | 1 |
| C12 | 1 | 1 | 1 | 1 | 1 | 1 |
| C13 | 1 | 1 | 1 | 1 | 1 | 1 |

For the residue: 1—no residue, 2—minimal residue, 3—significant residue, 5—total retention.

The phosphatidylcholine lecithins all showed compatibility with all the fertilisers tested, with the non-enriched phosphatidylcholine lecithins in particular showing excellent compatibility.

Example 4—Suspensions with Rheological Modifier

Formulations were prepared according to the invention and contain attapulgite clay as a thickening agent. To prepare 40 ml of SC, a formulation blank was prepared by adding the requisite amount of water to a 4 oz jar. While stirring with a magnetic stir bar, the requisite amount of surfactant, 0.04 g SAG1572, 0.04 g Proxel GXL, and 2.34 g propylene glycol were added. Stirring was continued until a homogenous mixture was achieved.

9.59 g of unmilled active ingredient was added and stirred to wet into the blank. After the active ingredient was incorporated into the blank, the formulation was mixed with a Silverson LR4 homogeniser, equipped with a ¾" tubular mixing head, at 10,000 rpm for one minute. After homogenisation, 80 g of milling media (Fox Industries, 0.8-1.0 mm glass beads) was added. The sample was agitated, in an ice bath, with a Talboy 134-1 overhead stirrer at setting 4.5 for 30 minutes. The formulation was separated from the milling media by vacuum filtration using a 150 mesh screen. After separation, the Attaflow FL was added, adjusting the amount based on the recovery.

The following three concentrates (C14 to C15) were formed as shown in Table 11.

TABLE 11

Concentrates with rheology modifiers (values all weight percentages)

| Ingredient | C14 | C15 |
|---|---|---|
| Atrazine | 22 | 22 |
| AL-2575 | 4 | 4 |
| Ultralec P | 4 | 4 |
| Metasperse 500L | | 2 |
| SAG 1572 | 0.1 | 0.1 |
| Proxel GXL | 0.1 | 0.1 |
| Propylene Glycol | 6 | 6 |
| Attaflow FL | 14 | 14 |
| Water | 49.8 | 47.8 |

The concentrates were then formed in to formulations and included in to fertilisers in the same way as Example 1. The formulations were tested for compatibility with fertiliser as made and after accelerate aging for 2 weeks at 54° C.

The results are shown in Tables 12 and 13.

TABLE 12

Fertiliser compatibility dispersion results

| Concentrate Used | | Initial Dispersion F1 | F2 | F3 | F5 | F4 | F6 | Dispersion Quality F1 | F2 | F3 | F5 | F4 | F6 |
|---|---|---|---|---|---|---|---|---|---|---|---|---|---|
| C14 | As Made | 1 | 1 | 1 | 1 | 1 | 1 | 1 | 1 | 1 | 2 | 1 | 1 |
| | Aged | 1 | 1 | 1 | 1 | 1 | 1 | 1 | 1 | 1 | 1 | 1 | 1 |
| C15 | As Made | 1 | 1 | 1 | 1 | 1 | 1 | 1 | 1 | 1 | 1 | 1 | 1 |
| | Aged | 1 | 1 | 1 | 1 | 1 | 1 | 2 | 1 | 1 | 1 | 1 | 1 |

For the initial dispersion: 1—good dispersion, 2—slight agglomeration, 3—agglomeration.

TABLE 13

Fertiliser compatibility residue results

| Concentrate Used | | Residue on 300 μm Screen F1 | F2 | F3 | F5 | F4 | F6 |
|---|---|---|---|---|---|---|---|
| C14 | As Made | 2 | 2 | 1 | 1 | 1 | 1 |
| | Aged | 2 | 1 | 1 | 1 | 1 | 1 |
| C15 | As Made | 1 | 1 | 1 | 1 | 1 | 1 |
| | Aged | 2 | 1 | 1 | 1 | 2 | 1 |

For the residue: 1—no residue, 2—minimal residue, 3—significant residue, 5—total retention.

The lecithins showed excellent compatibility and stability with the fertilisers tested with rheology modifiers present.

The example formulations according to the invention showed excellent compatibility with the fertilisers and excellent stability on accelerated aging. This compares favourably with existing similar SC in liquid fertiliser formulations which typically show poor fertiliser compatibility.

It is to be understood that the invention is not to be limited to the details of the above embodiments, which are described by way of example only. Many variations are possible.

The invention claimed is:

1. A homogeneous agrochemical concentrate consisting of:
3.0 to 8% by weight of phosphatidyl inositol enriched de-oiled lecithin;
a $C_8$-$C_{10}$ alkylpolyglucoside and/or a polyoxyethylene alkyl ether phosphate dispersant;
water and/or an organic solvent;
an antimicrobial selected from the group consisting of sodium 2-phenylphenate and 1,2-benzisothiazolin-3-one;
a polysiloxane;
a styrene acrylate copolymer and/or a styrene acrylate AMPS copolymer; and
a biocide selected from the group consisting of fungicides, insecticides, herbicides and mixtures thereof,
wherein the alkylpolyglucoside and/or polyoxyethylene alkyl ether phosphate dispersant is present in an amount of 0.8 to 4 wt % relative to the total weight of the concentrate.

2. An aqueous formulation consisting of:
i) the homogeneous concentrate according to claim 1; and
ii) a water soluble inorganic fertiliser containing one or more of nitrogen, phosphorus and potassium,
wherein the concentrate is present in an amount of 0.2 to 2% by weight, and the fertiliser is present in an amount of 5 to 35% by weight.

3. An end use agrochemical formulation formed by dilution of the aqueous formulation according to claim 2.

4. The concentrate according to claim 1, wherein the $C_8$-$C_{10}$ alkylpolyglucoside and the polyoxyethylene alkyl ether phosphate are both present.

5. The concentrate according to claim 1, wherein the biocide is a contact fungicide.

6. The concentrate according to claim 1, wherein the biocide is a systemic fungicide.

7. The formulation according to claim 3, wherein the biocide is present in an amount of 0.001 to 1% by weight of the total formulation.

8. A method of preparing the homogeneous concentrate according to claim 1, the method consisting of mixing together the lecithin, the alkylpolyglucoside and/or the polyoxyethylene alkyl ether phosphate, the solvent, the antimicrobial, the polysiloxane, the styrene acrylate copolymer and/or the styrene acrylate AMPS copolymer and the biocide.

9. A method of preparing the homogeneous concentrate according to claim 1, the method consisting of contacting a blend of the lecithin, the alkylpolyglucoside and/or the polyoxyethylene alkyl ether phosphate, the solvent, the antimicrobial, the polysiloxane, the styrene acrylate copolymer and/or the styrene acrylate AMPS copolymer with the biocide.

10. A pre-blend of phosphatidyl inositol enriched de-oiled lecithin, a $C_8$-$C_{10}$ alkylpolyglucoside and/or a polyoxyethylene alkyl ether phosphate, water and/or an organic solvent, an antimicrobial selected from the group consisting of sodium 2-phenylphenate and 1,2-benzisothiazolin-3-one, a polysiloxane, a styrene acrylate copolymer and/or a styrene acrylate AMPS copolymer, and a biocide selected from the group consisting of fungicides, insecticides, herbicides and mixtures thereof, suitable for use in the concentrate according to claim 1.

11. A method of treating vegetation to control pests, the method consisting of applying the formulation according to claim 2, either to the vegetation or to the immediate environment of the vegetation.

12. A method of treating vegetation to control pests, the method consisting of applying the formulation according to claim 3, either to the vegetation or to the immediate environment of the vegetation.

13. A method of preparing the aqueous formulation according to claim 2, consisting of combining i) and ii).

* * * * *